United States Patent

Koops et al.

[11] Patent Number: 5,982,962
[45] Date of Patent: Nov. 9, 1999

[54] FIBER-INTEGRATED MICROLENSES AND OPTICAL FIBER FBG COUPLERS, SPECTROMETERS, AND MULTIPLEXERS COMPRISED THEREOF

[76] Inventors: Hans W. P. Koops, Ernst Ludwig Strasse 16, 64372 Ober-Ramstadt, Germany; Gerald Meltz, 77 Daventry Hill Rd., Avon, Conn. 06001

[21] Appl. No.: 08/993,066

[22] Filed: Dec. 18, 1997

[30] Foreign Application Priority Data

Mar. 29, 1997 [DE] Germany .......................... 197 13 374

[51] Int. Cl.⁶ .................................................. G02B 6/34
[52] U.S. Cl. .............................................................. 385/37
[58] Field of Search ............................... 385/12, 30, 31, 385/37, 147; 356/345

[56] References Cited

U.S. PATENT DOCUMENTS

| | | | |
|---|---|---|---|
| 5,680,489 | 10/1997 | Kersey | 385/12 |
| 5,748,312 | 5/1998 | Kersey et al. | 356/35.3 |
| 5,818,585 | 10/1998 | Davis et al. | 356/345 |
| 5,892,582 | 4/1999 | Bao et al. | 356/345 |

*Primary Examiner*—Akm E. Ullah
*Attorney, Agent, or Firm*—M. P. Williams

[57] ABSTRACT

A microlens 30 is formed on the outer surface of an optical fiber 20 having an in-fiber Bragg grating 24 (FBG) formed in the core 21, 36 thereof, to focus light diffracted by the FBG onto other fibers or optical devices, or to focus light received at the fiber onto the FBG. Various single- and multi-microlens configurations of one or more fibers perform a variety of functions such as signal coupling, multiplexing, signal splitting, spectrography, tapped delay, timed-delay phase adjusting, circulating storage, and so forth. The microlenses may employ angle-increasing prisms and may comprise Fresnel lenses.

29 Claims, 11 Drawing Sheets

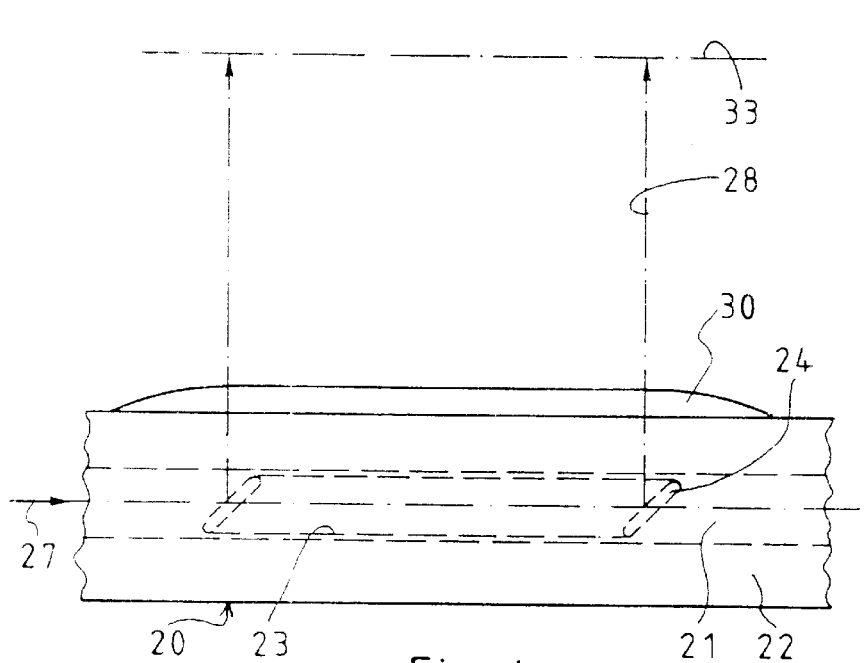
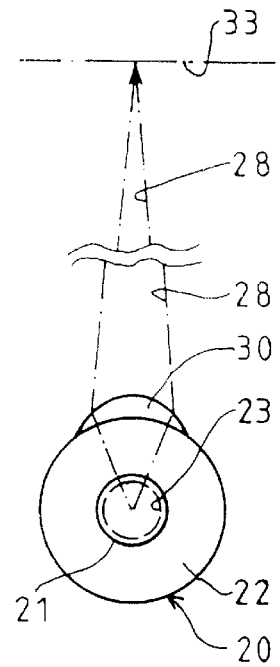
Fig. 4
Fig. 5
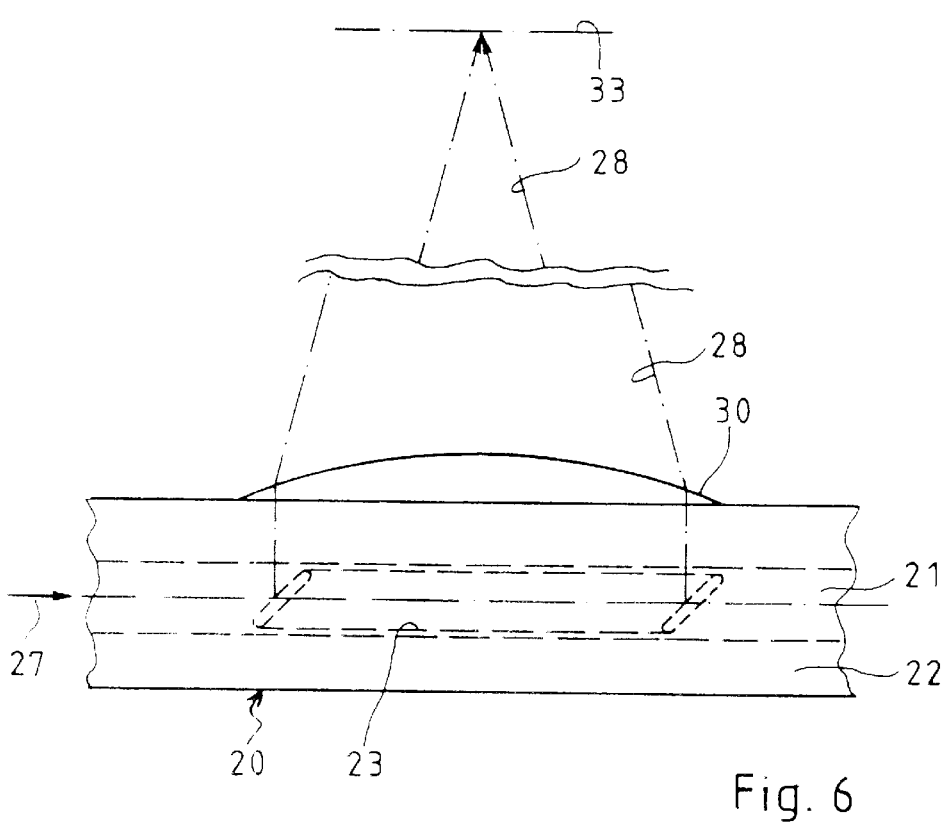
Fig. 6

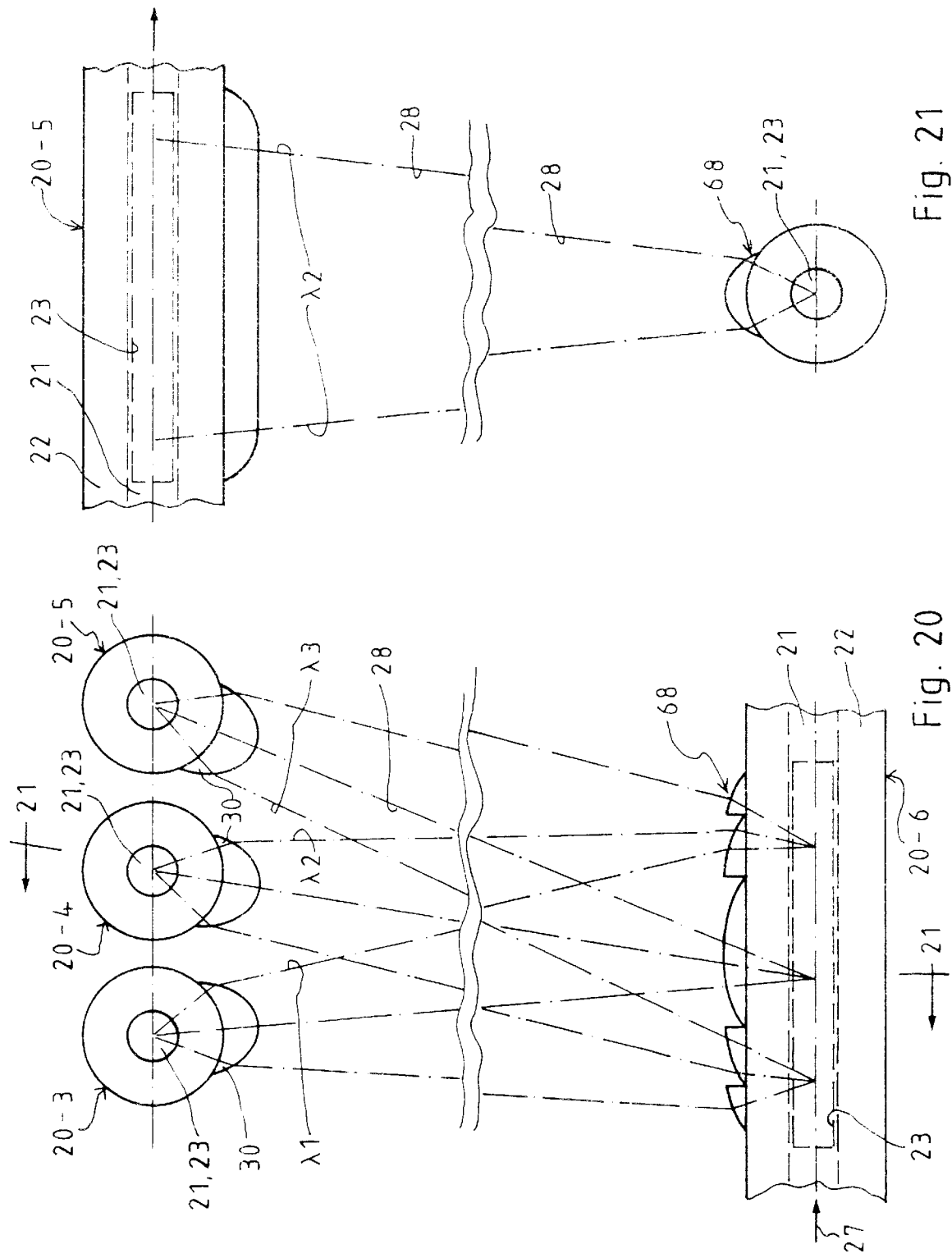

FIBER-INTEGRATED MICROLENSES AND OPTICAL FIBER FBG COUPLERS, SPECTROMETERS, AND MULTIPLEXERS COMPRISED THEREOF

TECHNICAL FIELD

This invention relates to lenses formed directly on the cylindrical surface of the cladding of an optical fiber to permit focused transmission of light into and out of an in-fiber Bragg grating (FBG) formed within the core of the optical fiber, as well as couplers, spectrometers and multiplexers employing such microlenses and FBG's.

BACKGROUND ART

It is relatively easy to couple light between aligned optical fibers, and between a point source and an optical fiber by means of a lens attached to the pupil (the end) of the fiber which focuses the light to or from the fiber aperture, as described by Babin, Weber and Koops, "Fabrication of a Refractive Microlens Integrated Onto the Monomode Fiber", Proc EIPBN 1996, J. Vac. Sci. Technol. B14(6), p. 4076, November/December 1996 (Ref. 1), and in Koops and Babin, "Verfahren zur Herstellung und Justierung von Mikrolinsen auf Faser und Laserenden" (1996) P 19 54 5721.8 (Ref. 2). However, there are many instances in which it is desired to couple light between one fiber and a plurality of fibers, or between multiple lines, such as in a complex laser source, or in other instances where fan or cone-shaped light patterns result. These are extremely difficult to focus to and from a spot-shaped fiber entrance pupil. Spectrometers involved with optical fibers are complex, costly and difficult to use. Wavelength division multiplexing, wherein light of different wavelengths has to be combined from several fibers into a single fiber or separated from one fiber into several fibers is extremely difficult for a variety of reasons, including the foregoing reasons.

DISCLOSURE OF INVENTION

Objects of the invention include improved coupling between optical fibers and related optical elements, including other optical fibers; provision of a simplified spectrometer employing optical fibers; and provision of improved wavelength division multiplexing and signal splitting.

According to the present invention, a microlens is formed directly on the surface of the cladding of an optical fiber. According to the invention, the microlens may be aspherical, such as cylindric, focusing light into stripes of various width, whether converging, diverging or collimated, which is useful in coupling the light directly to a similar microlens-fitted optical fiber, or the lens may be spherical (including hyperbolic spheroids) thereby focusing the light through the microlens into collimated light, or into slightly diverging or converging beams, or to a spot; the lens may be anamorphic (different focal lengths in different planes) or amorphic (same focal length in orthogonal planes).

In accordance with the invention, lenses may be inscribed in the cladding of M profile fibers in which FBGs are formed alongside in the cladding or outer core of the fiber. According to the invention, lenses may be formed having optical axes transverse to the axis of the underlying fiber, either perpendicular or at an angle with the axis of the underlying fiber, utilizing underlying prisms to alter the orientation of the lens optical axis. The invention may provide lenses and structures of any shape, including Fresnel lenses.

The invention includes a number of FBG/microlens sets in one fiber feeding individual FBG/microlens sets in adjacent fibers for coupling between fibers, a relatively large number of fiber outputs being capable of accommodation.

The invention readily permits separating component wavelengths of a radiation sample in a focal plane adjacent to and parallel with the axis of the fiber; an FBG/microlens set used with a movable array of optical detectors, provides a simple spectrometer in accordance with the invention. Tapped delay lines may be formed with the invention.

In accordance with the invention, wavelength division multiplexing (WDM) and de-multiplexing (signal splitting) is easily accomplished utilizing lenses of the invention to separate or collect light of different wavelengths, by selecting a Bragg grating periodicity which is within the spacing suitable for transverse diffraction of all the involved wavelengths, in some cases using lenses (such as Fresnel lenses) having extended focusing capability. Tapped delay lines, circulating storage and timed-delay phase adjustment are also enhanced with the invention.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 4 is a sectioned, side elevation view of an in-fiber Bragg grating with an integrated cylindrical microlens formed on the cylindrical surface of the fiber cladding, in accordance with the present invention (sectioning lines have been omitted for clarity).

FIG. 5 is an end elevation view of the in-fiber Bragg grating and mini-lens of FIG. 4.

FIG. 6 is a sectioned, side elevation view of an in-fiber Bragg grating with an aspherical microlens according to the invention for focusing in two dimensions (sectioning lines have been omitted for clarity).

FIG. 20 is a side elevation view of a WDM employing a Fresnel lens.

FIG. 21 is a partially sectioned, end elevation view taken on the line 21—21 in FIG. 20 (sectioning lines have been omitted for clarity).

BEST MODE FOR CARRYING OUT THE INVENTION

Figure 1:
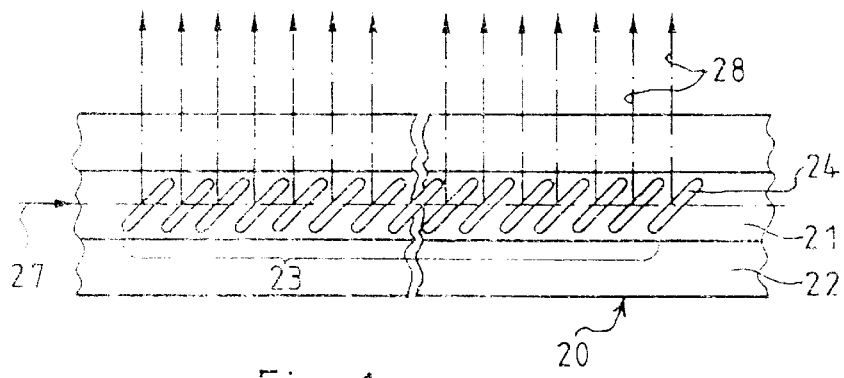
FIG. 1 is a sectioned, schematic side elevation view of an in-fiber Bragg grating within the core of an optical fiber in accordance with the prior art (sectioning lines have been omitted for clarity.)

Referring to FIG. 1, an optical fiber 20 includes a core 21 and cladding 22. Within the core 21, an in-fiber Bragg grating (FBG) 23 is formed by a known inscription technique with the variations in index of refraction (gratings) disposed at an angle, which is referred to herein as "blazed". The optical fibers are preferably formed of silica, and the maxima 24 of the variations (hereinafter referred to as "blazes") are formed in the core 21 by exposing the fiber core to an interference pattern of two overlapping ultraviolet beams, as is known. The blaze is achieved by tilting the fiber in the interference pattern, as is known. Discrete blazes 24 are not formed, but rather, the pattern of index of refraction varies in a periodic fashion determined by the variation of intensity of the ultraviolet light and the movement of the fiber through the ultraviolet light when manufactured. However, because of the additive effects, the optical results can be viewed as having been caused by discrete blazes 24. The design and manufacture of FBG's is described, inter alia, in U.S. Pat. Nos. 5,546,481 (Ref. 3), 5,511,083 (Ref. 4), 5,061,032 (Ref. 5), 5,042,897 (Ref. 6), in Meltz et al, "In-Fiber Bragg Grating Taps", Optical Society of America, Optical Fiber Communications Conference, 1990, Technical Digest Series, Vol. 1, Jan. 22, 1990 (Ref. 7), and in Meltz and Morey, "Design and Performance of Bi-Directional Fiber Bragg Grating Taps", Optical Society of America, Optical Fiber Communications Conference, 1991, Technical Digest Paper TuM2, p. 44, Feb. 19, 1991 (Ref. 8).

Figure 2:
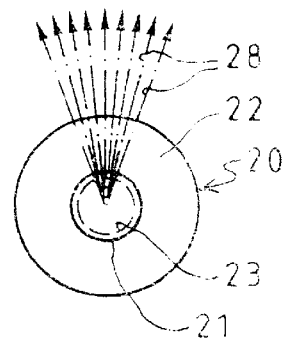
FIG. 2 is an end elevation view of the in-fiber Bragg grating of FIG. 1.
Figure 3:
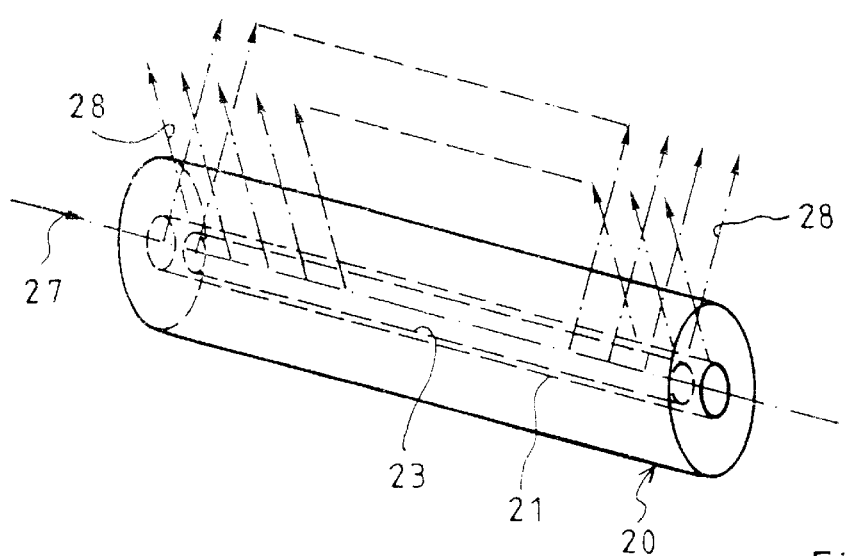
FIG. 3 is a stylized perspective view of the in-fiber Bragg grating of FIGS. 1 and 2.

In FIG. 1, a beam 27 of input radiation is assumed to be at a single wavelength and the Bragg grating 23 causes light of that wavelength to exit in a direction which is generally transverse to the axis of the fiber 20. In the illustrations herein, light enters from the left and is diffracted upwardly. Of course, light entering from the right would diffract downwardly. In FIG. 1, the output radiation 28 appears to be normal to the axis of the fiber, but such is not generally the case, the exact angle of radiation exiting the Bragg grating is dependent upon the relationship between the periodicity of the Bragg grating and the wavelength of the radiation 27. This is described more fully hereinafter with respect to FIGS. 10 and 12. In FIG. 1, the radiation appears to be leaving more or less collimated in the plane containing the axis of the fiber 20 which is normal to the blazes 24. However, FIGS. 2 and 3 illustrate that the output radiation 28 is highly divergent (about 10°) in any plane which is transverse to the axis of the fiber 20. Therefore, the use of the FBG as shown in FIGS. 1–3 has heretofore required an external lens which in turn must be fabricated on a separate carrier, and has required a separate lens mounting which together must provide extremely high-precision placement of the lens with respect to the position of the FBG 23 along the fiber 20 and with respect to a plane normal to the blazes 24 (straight up in FIG. 2), herein referred to as the principal plane of diffraction of the FBG. Such arrangements render the FBG less than useful for many if not most applications, and do not readily answer the objectives of improved coupling to and from optical fibers.

Referring now to FIGS. 4 and 5, in accordance with the invention, a cylindrical lens 30 will collect the output radiation 28 in a stripe-shaped focus having the same width in the far field as the diffraction disc of the lens, focusing into a line at a focal plane 33 in the far field. As seen in FIG. 5, the lens has a curved surface, preferably having a hyperbolic rather than circular shape, as is described by Edwards, Presby and Dragone, "Ideal Microlenses for Laser to Fiber Coupling", J. Lightwave Tech. Vol. 11, No. 2, February 1993, pp. 252–257 (Ref. 9). The hyperbolic lens described therein is formed on the optical entrance window (end) of a fiber, using laser micro-machining which ablates the silica fiber, under computer control. A similar microlens, on the end of a fiber, can be fabricated utilizing dry resist vacuum deposition lithography, employing either a corpuscular beam (such as ions or electrons), with a high depth of focus, or X rays using intensity modulated reticles, as described by Babin and Koops, "Three-dimensional Electron Beam Lithography Using an All-Dry Resist Process", Proc. EIPBN, 1996, J. Vac. Sci. Technol. B14(6), p. 3860, November/December 1996 (Ref. 10). Applying this process to the invention, an initial resist layer of defined thickness is grown onto the fiber cladding by evaporation. Exposure causes the dry resist substance to be polymerized and cross-linked by appropriate dosage distribution so that a suitably shaped lens (in this case, a segment of a hyperbolic cylinder) is obtained with a suitable focal length in a direction transverse to the axis of the fiber 20, and an infinite focal length in a plane which includes the axis. The fabrication of a microlens on the end of a fiber is further described by Babin, Weber and Koops, "Dry Resist Technology to Fabricate Optimized Micro-lens Centered to the End of a Monomode Fiber with Electron Beam Lithography", SPIE 1996 Int. Conf. on Microlithography, San Jose 1996, SPIE V. 2724, p. 578 (Ref. 11), and by Koops et al, "Evaluation of Dry Resist Vinyl-T8 and its Application to Optical Microlenses", Microelectronic Engineering, 1996, V. 30, p. 539 (Ref. 12). The dry resist technique and the brightness of corpuscular beam and X ray lithography make it possible to generate the lens profile on the fiber cladding either by dosage distribution during corpuscular illumination, or by use of appropriately graded masks for X ray exposure, the transparency of which moderates and locally modulates the illumination density. Both corpuscular beams and X rays exhibit a depth of focus which is far in excess of that required. The lens is centered (such as by means of an illuminating scanning electron microscope) to the fiber cladding along radii coextensive with the exit direction from the FBG (normal to the blazes) utilizing previously applied markers used to orient the FBG.

Following exposure, the non-polymerized resist material is removed by thermal, wet- or dry-chemical development to provide the desired lens profile. The microlens may also be produced by use of beam-induced polymerization of surface-adsorbed or surface-condensed monomers, the feeding of the monomer being controlled by means of a slot mask to determine the lens profile, and the monomer being polymerized by light delivered through the fiber and diffracted from the FBG with which the lens is to function. The degree of focusing which is attainable is limited by the numerical aperture processible in the lens manufacture in relation to the wavelength of radiation in use. These relationships are well known and set forth, inter alia, in Hect, *Optics*, 2nd Ed., Addeson-Wesley Pub. Co., 1990, Chapter 10 (Ref. 14).

If the length of the FBG, and therefore the companion microlens, is sufficiently long so as to require piece-wise manufacture, a special stitching enter the other of the lenses 30. The distance between the two (not represented truly in FIG. 7) can be adjusted to suit the mechanical mounting requirements in order to keep the two lenses aligned for substantial optical coupling between them. In such case, the lenses will have a focal length substantially equal to the radius of the fiber 20, so that the light is focused on the FBG 23 in the fiber core 21. Generally speaking, coupling of optical radiation, such as coupling of digital data, need not require focusing to a spot, so the spacing between lenses in a coupler is typically not critical. However, if for some reason the illumination being coupled must be focused to a spot, then the choice of lenses and the distance between the lenses must be selected accordingly.

Figure 8:
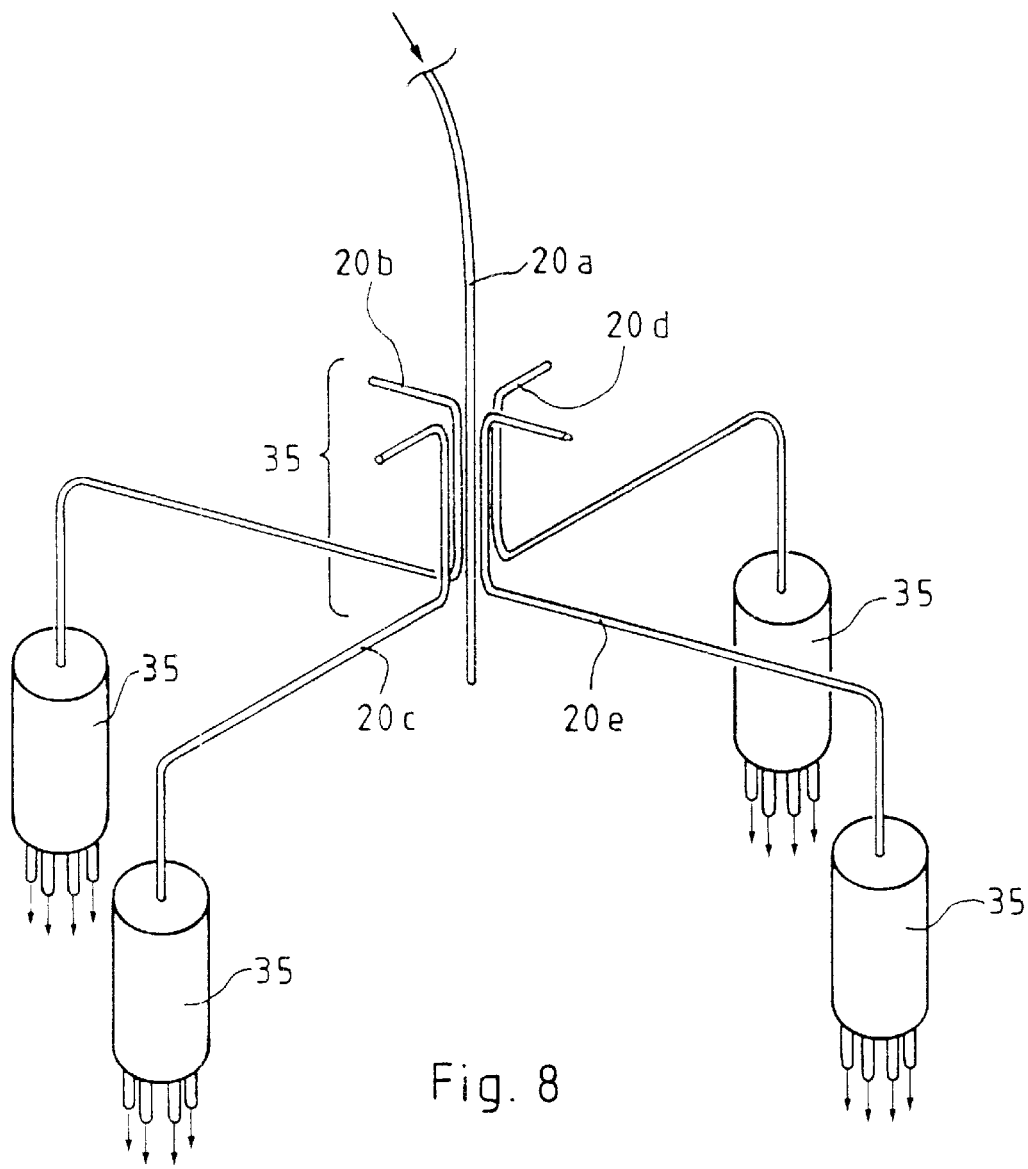
FIG. 8 is a perspective view, partially stylized, of a one-to-sixteen coupler employing the present invention.

Referring to FIG. 8, a one-to-sixteen coupler is illustrated as having five one-to-four couplers 35. Each of the one-to-four couplers has an inlet fiber 20a and four outlet fibers 20b–20e. In this case, the inlet fiber 20a has four FBG's formed in it with four corresponding microlenses (as in FIG. 7, not shown in FIG. 8 for clarity). Each FBG can be formed, in a fashion described with respect to FIGS. 1–3 hereinbefore, superimposed over the others in the same length of the core. Each of the four microlenses will be aligned with a corresponding FBG in the manner described hereinbefore. Due to the Bragg diffraction in each FBG, none of them interfere with the others, and each operates essentially as if it were the only FBG disposed in that region of the core. As shown in FIG. 8, the four output fibers 20b–20e may in turn become part of additional four-to-one couplers 35 so as to form a one-to-sixteen coupler, overall. Of course, couplers could be used with odd (e.g., one-to-technique may be used so that the exposure fields connect highly accurately, as described in Koops, Kretz, and Weber, "Combined Lithographies for the Reduction of Stitching Errors in Lithography", Proc. EIPBN 1994, J. Vac. Sci. Technol. B12(6) (1994) pp. 3265–3269 (Ref. 13).

Light leaving the FBG, being focused, has a greater intensity than the unfocused light. Similarly, light can be coupled into the fiber 20 by means of the lens 30 and the FBG 23, in which case higher energy density (a higher pump effect) is created in the fiber core; frequently, adequate optical input to a monomode fiber can be achieved in a microlens/FBG combination having a length of a few millimeters or more. This enables, for instance, a particularly high efficiency in optical energy transfer in practical applications, such as in pumping a laser which incorporates the fiber 20.

Referring to FIG. 6, the lens 30 may be spherical, having a circular or preferably hyperbolic shape, in dimensions both parallel with and transverse to the axis of the fiber 20. If the lens is anamorphic, the output radiation 28 is focused to a spot on the focal plane 33, as shown. An anamorphic lens has different focal lengths in diverse dimensions, as is known. FIG. 5 is applicable to the spherical lens of FIG. 6 as well as the cylindrical lens of FIG. 4.

Figure 7:
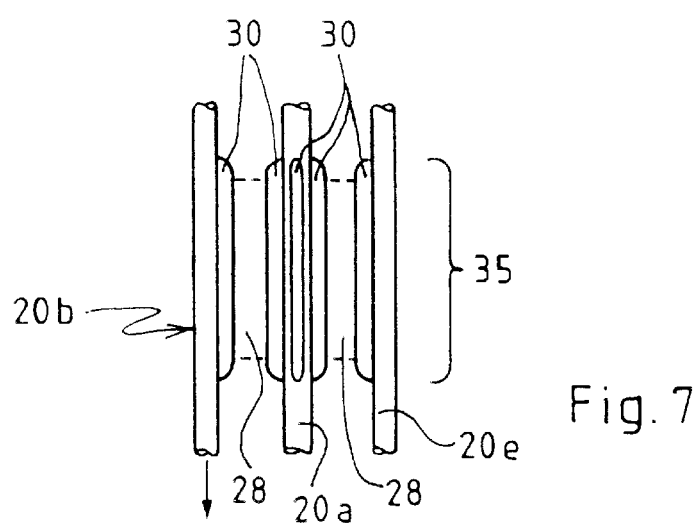
FIG. 7 is a side elevation view of a portion of a one-to-four coupler employing the present invention.

Referring to FIG. 7, coupling of optical radiation from a first fiber 20a to a second fiber 20b in a one-to-four coupler 35 is readily achieved using cylindrical lenses which will focus the radiation essentially into a line, being sufficiently close to collimated in the plane of the fibre axis so that nearly the entire output of one of the lenses 30 will five) and other numbers, and the couplers shown in FIGS. 7 and 8 may operate in the reverse so that light is received by the fibers 20b–20e from corresponding couplers 35 and transmitted into the fiber 20a, since the FBG/microlens combination of the invention is bidirectional.

If desired, the necessity to orient the microlenses appropriately with respect to a plurality of over-laid FBGs can be avoided by providing substantially omnidirectional FBGs. This is achieved during the exposure of the fiber by rotating the fiber while at the same time displacing it longitudinally, slightly, so that individual gratings (blazes) are slightly displaced from each other longitudinally and the angle of each string of blazes, and therefore the principal plane of diffraction, is slightly different than the angle of the adjacent blazes. As an alternative, use of an unblazed (perpendicular to fiber axis) pattern will diffract the light outwardly in a conical pattern. The intensity of a conical pattern is low, but some light may be captured by a microlens at any orientation to the FBG. In such a system, the microlenses may be placed anywhere on the periphery of the fiber so long as they are parallel with the axis of the fiber.

Figure 9B:
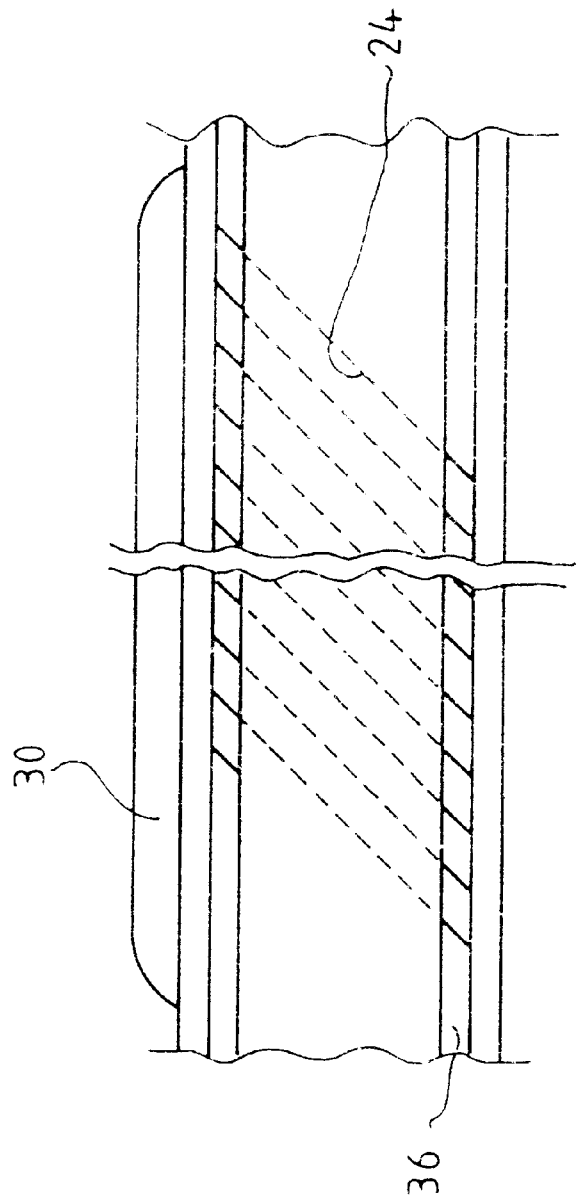
FIG. 9B is a sectioned, schematic side elevation view of an in-fiber Bragg grating within the ring of an M-profile optical fiber in accordance with the invention (sectioning lines have been omitted for clarity.)
Figure 9A:
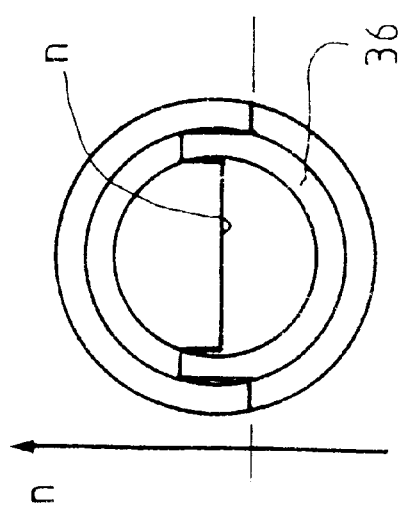
FIG. 9A is a diagram of the doping profile of an M-profile fiber known to the prior art.

Another form of coupler may be provided for M-profile fiber lasers, receiving pump light through microlenses on the surface of the fiber and FBGs in the outer core 36, FIG. 9A (sometimes referred to as the "cladding"). See: P. Glas et al, "Novel design for a high brightness diode pumped fiber laser source" Optics Communications, Vol. 122, pp. 163–168, 1996. The term "M-profile" refers to the generally "M" shape of the refractive index profile across a cross section of a fiber having an undoped, low index core, a highly doped inner cladding or ring adjacent the core, and an undoped outer cladding or coating, as shown in FIG. 9A. FIG. 9B shows the generally-washer-shaped blazes 24 in the doped ring and a microlens 30 on the outer coating. As is known, pump light at one wavelength (typically 980 nm) provided in the outer core amplifies the laser light at another wavelength (typically 1550 nm) in the central core. It is a property of the M-profile fiber laser that the longer wavelength laser light will not couple back into the outer core. By providing coupling from a number of surrounding fibers (such as four, sixteen, or sixty-four, or other number) into the M-profile fiber laser, very high pumping power can be obtained. In this case, the Bragg gratings within the M-profile fiber may be independent, spaced around the central core within the outer core. The fibers that feed the M-profile fiber may themselves be ordinary, single core fibers, as described hereinbefore. The processing is the same as described hereinbefore for providing related sets of microlenses and FBGs, the positioning and alignment being slightly different, but utilizing similar techniques. As used herein with respect to location of an FBG, the term "core" includes the outer core or cladding of an M-profile fiber.

Figure 10:
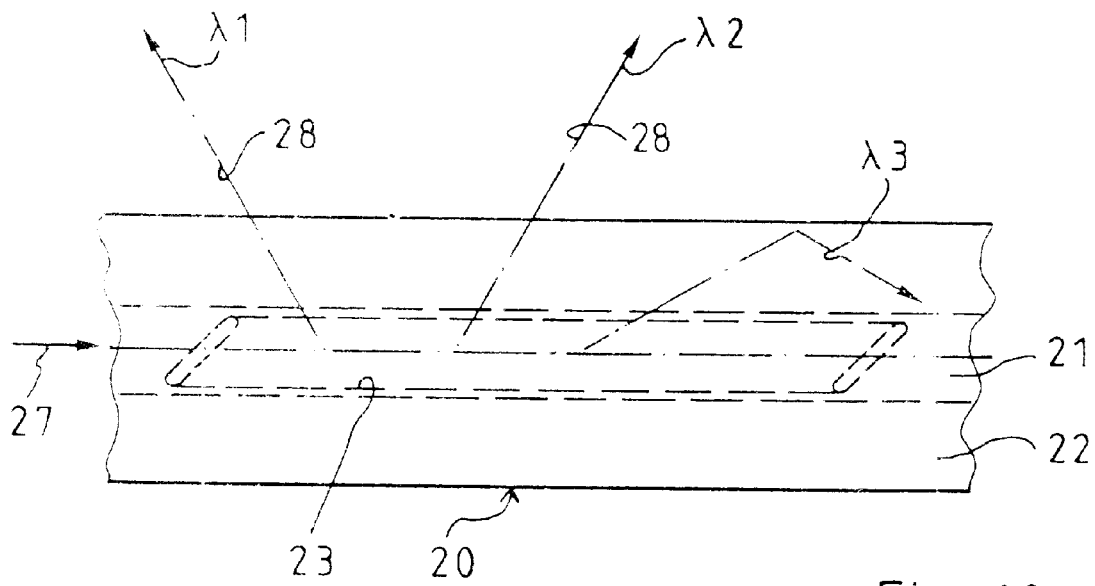
FIG. 10 is a side elevation view of a fiber illustrating principles of refraction and reflection.

Referring to FIG. 10, any given Bragg grating 23 will diffract radiation of a shorter wavelength, $\lambda 1$ at a more acute angle than the refraction of radiation at a longer wavelength λ2, as is known, and this results in a bandwidth of diffractable incoming radiation defined by the spread (periodicity) of the grating, and angle at which the radiation will exit the cladding, rather than be totally reflected back toward the core, as is shown for the case of a still longer wavelength λ3. (Ref. 6) It is also known that the lower the angle of the diffracted radiation (λ3 vs. λ2 in FIG. 10), the greater the intensity of the diffracted illumination and therefore the greater the coupling efficiency between the incoming radiation and the exiting radiation.

Figure 11:
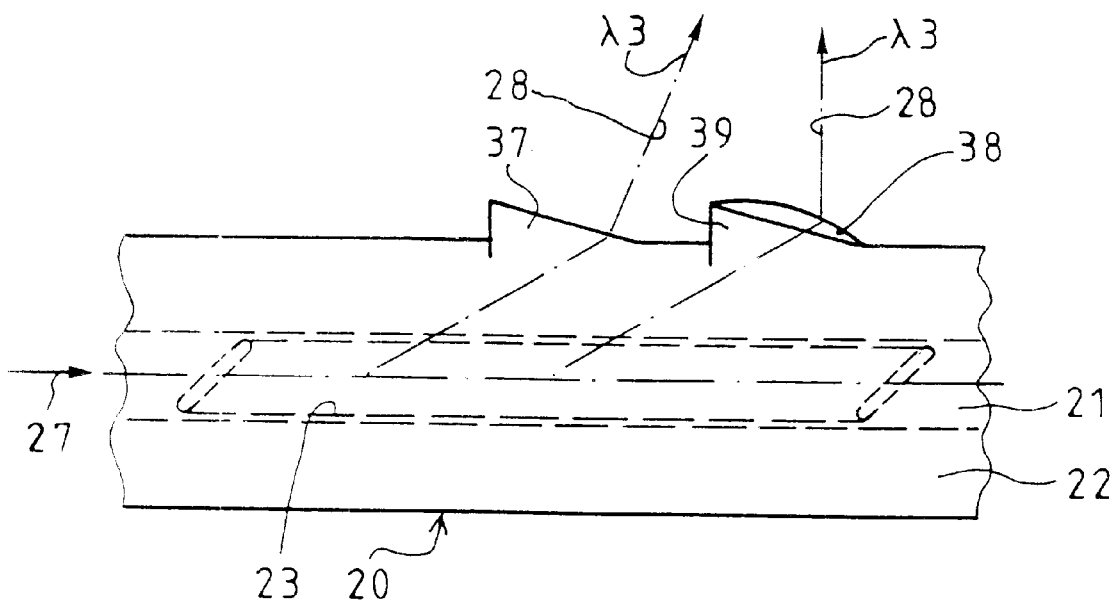
FIG. 11 is a side elevation view of a fiber illustrating the use of prisms and lenses of the invention having their optic axes at an angle with respect to the axis of the underlying fiber.

In FIG. 11, a prism 37 is formed on the cladding 22 of the fiber 20. The prism increases the angle between the surface of the cladding and the radiation sufficiently so that the radiation of λ3 will exit the fiber, rather than being reflected as in FIG. 10. By forming a lens 38 on a prism 39, focusing and steering of the output radiation can be achieved, in the manner described hereinbefore. In fact, the processes described hereinbefore for forming lenses directly on the cladding can form structures of any desired shape, one part at a time, so that the lenses of the invention can take the form of lenses 30 having their optical axes perpendicular to the axis of the underlying fiber, lenses 38 having their optical axes at an angle with respect to the axes of the underlying fiber, and discontinuous lenses, such as Fresnel lenses as is described hereinafter. The use of prisms and/or angular lenses as illustrated in FIG. 11 allows a wavelength/periodicity relationship resulting in very low angles of diffraction (λ3 in FIG. 10), which can so increase the optical efficiency as to permit use of much coarser, less efficient and therefore less costly FBGs. On the other hand, the bandwidth of the FBG can be increased in this fashion, if desired.

Figure 12:
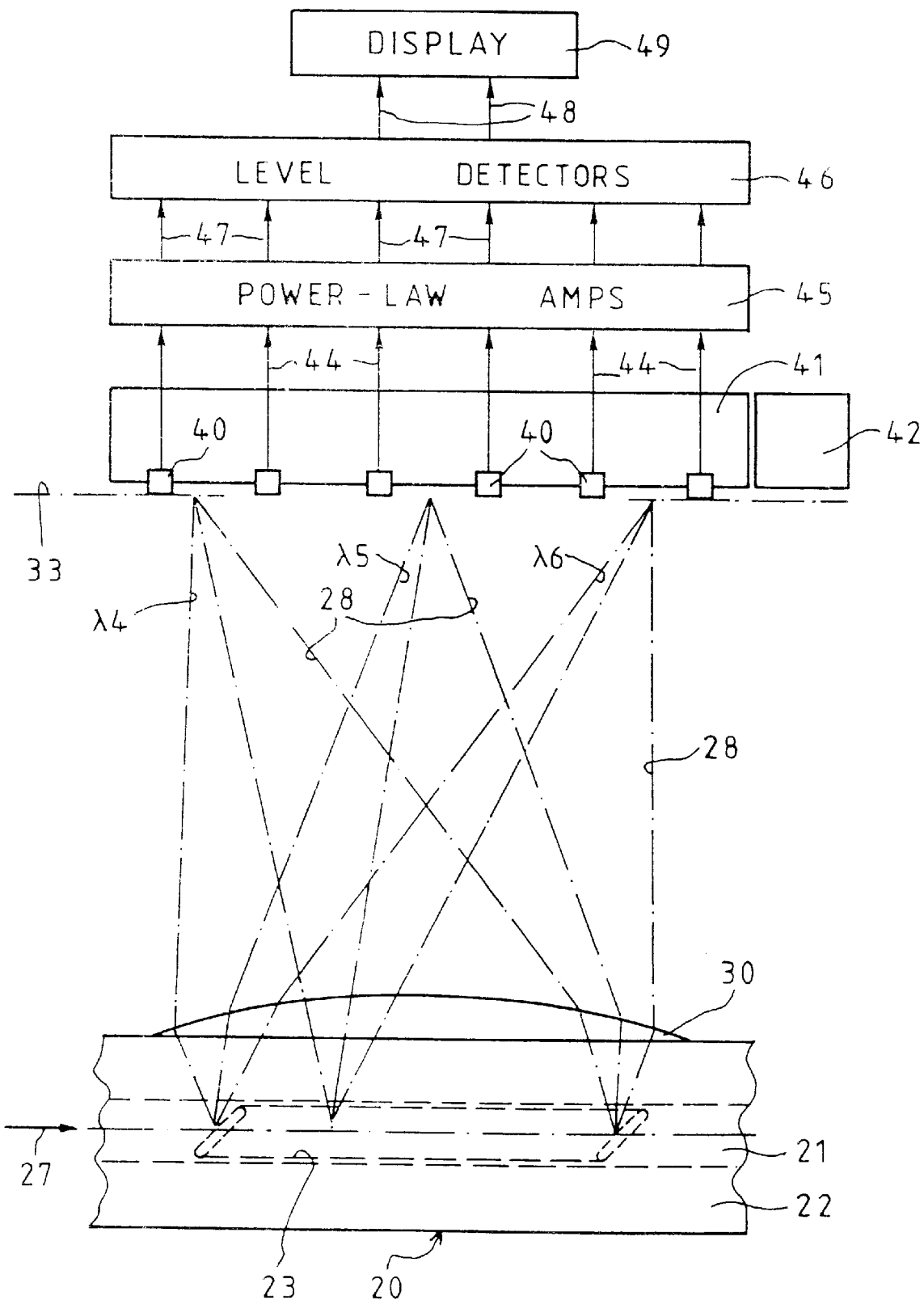
FIG. 12 is a side elevation view and schematic diagram of a spectrometer involving an FBG and microlens according to the present invention.

Referring to FIG. 12, a spectrometer in accordance with the invention may consist of an optical fiber 20 having a FBG 23 working with a microlens 30, of the type described with respect to FIGS. 5 and 6 hereinbefore. By suitable choice of the lens and the distance between the lens and its focal plane 33, radiation 27 entering the FBG with components of various wavelength can be separated into its constituent wavelengths so that the output radiation 28 includes components at different wavelengths, such as λ4, λ5, λ6 in FIG. 12, focused to corresponding spots at the focal plane 33. An array of suitable optical detectors 40, such as photoresistors, may be disposed on a suitable structure 41 for lateral motion (right and left in FIG. 12) by some suitable electromechanical means, such as a piezoelectric motor 42. Movement of the detectors 40 ensures that one or another of them will sense the maxima at various wavelengths, even though the spacing of the detectors 40 does not spatially align with such maxima, as is evident in FIG. 12. To enhance the sensitivity, the output of each detector 40 may be provided on a corresponding signal line 44 to a related one of a plurality of power-law amplifiers 45. In turn, each of the amplifiers 45 is fed to a corresponding one of a plurality of level detectors 46 by related signal lines 47. The results can be provided over a trunk of signal lines 48 to a display apparatus 49. Use of the microlens adjacent to an FBG in accordance with the present invention provides an extremely convenient way to spatially separate the light into its wavelength components.

Figures 13, 14:
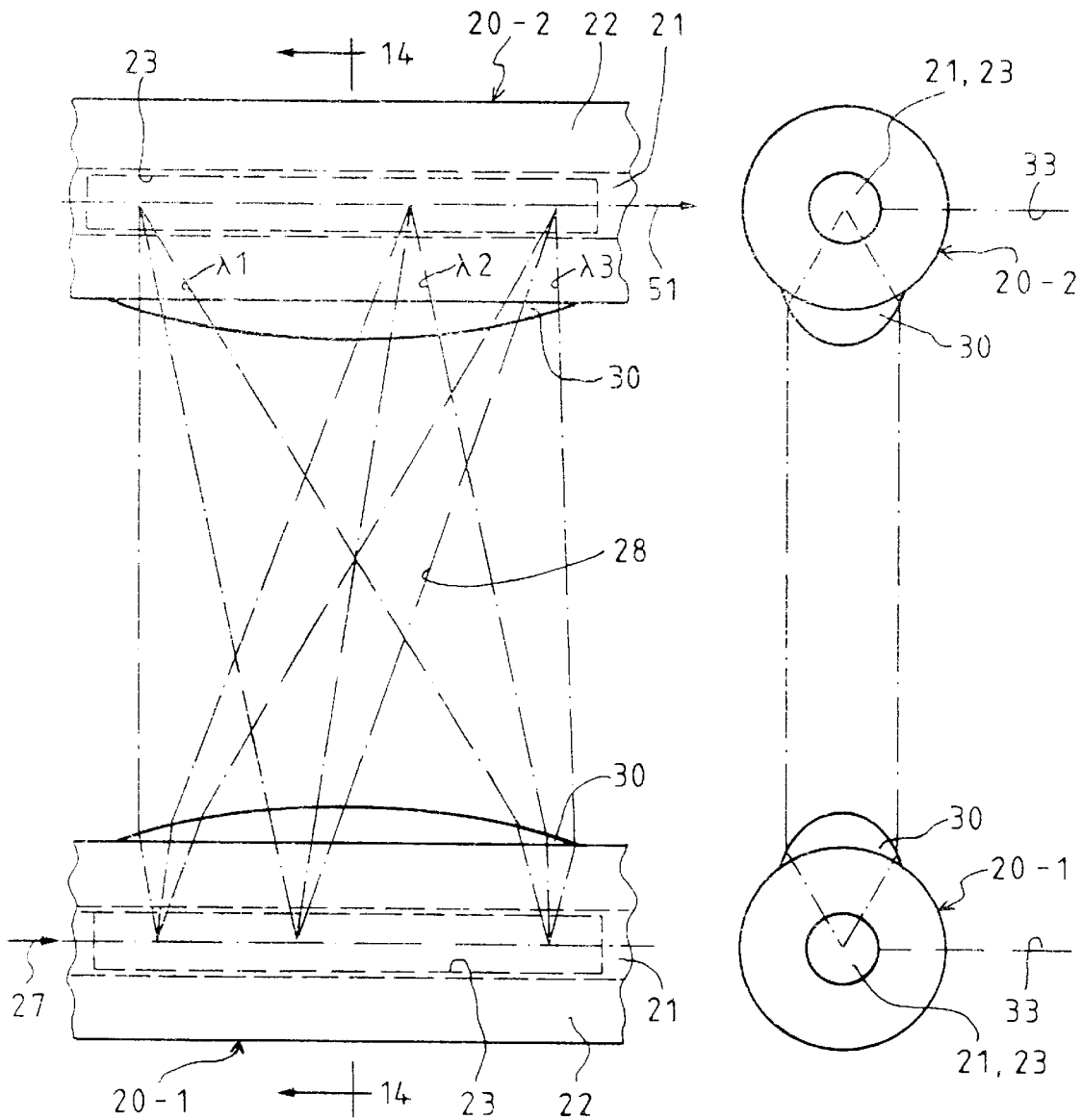
FIG. 13 is a side elevation view of a pair of fibers employing FBGs and the microlenses of the present inven
- FIG. 14 is a sectioned, side elevation view taken on the line 14—14 in FIG. 13 (sectioning lines being omitted for clarity).

Referring to FIGS. 13 and 14, a first form of wavelength division multiplexer separates multi-wavelength radiation 27 entering one optical fiber 20-1 by means of an FBG 23 and a microlens 30 of the type described with respect to FIGS. 5 and 6 hereinbefore. The output radiation 28 is separated into component wavelengths, such as λ1, λ2, λ3. A second fiber 20-2 has a similar lens 30 and FBG 23 so that the illumination of different wavelengths is focused in the FBG of the fiber 20-2 at spots separated from one another within the FBG 23. Thus, the exiting radiation 51 will have pulses of different wavelengths separated in time, λ3 being first, λ2 being second and λ1 being last. This function may be utilized in a tapped delay line.

Figures 15, 16:
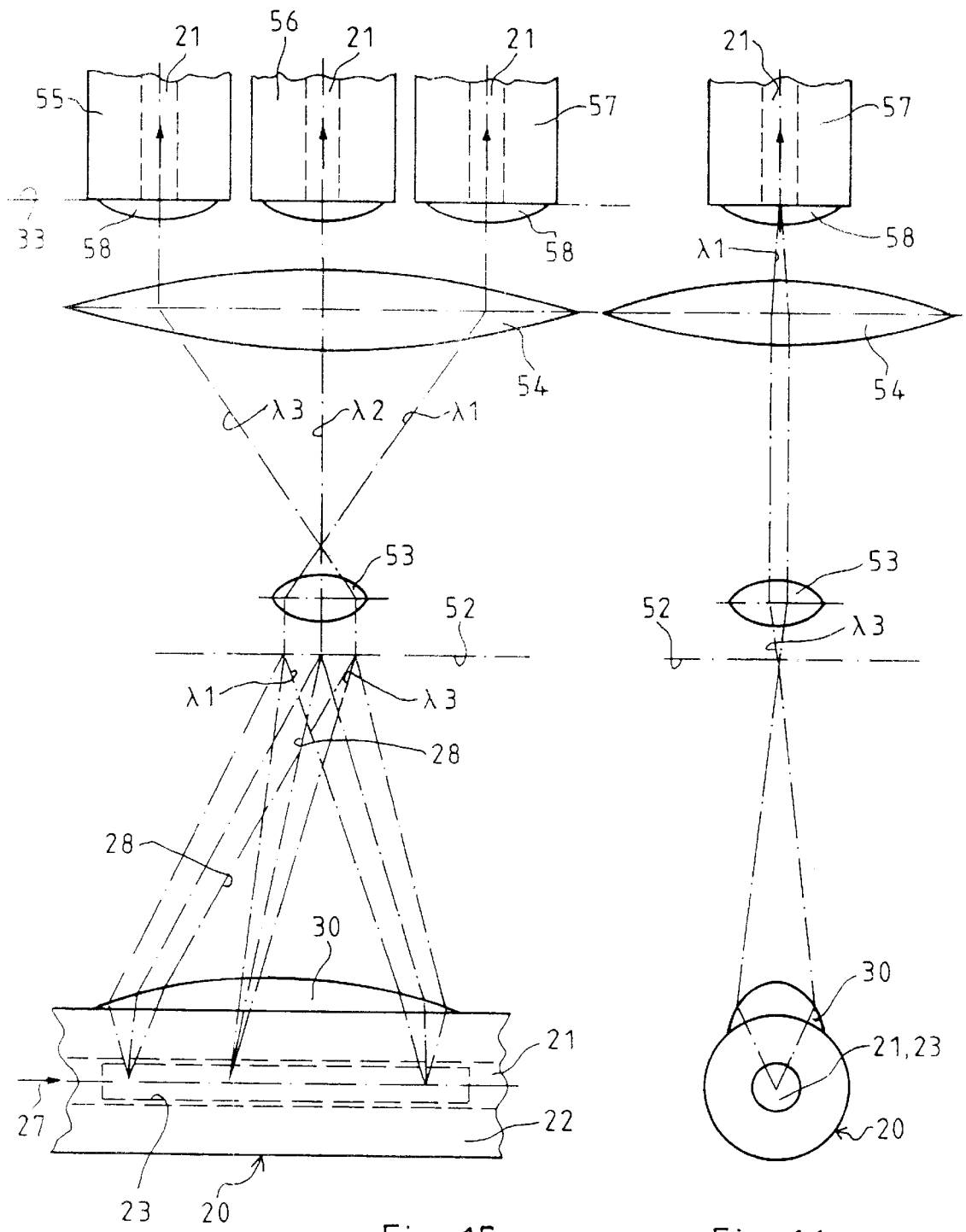
FIG. 15 is a side elevation view of a WDM apparatus employing two magnifying lenses for separating wavelength components and directing them into the light entrance windows of corresponding fibers.
FIG. 16 is an end elevation view of the apparatus of FIG. 15.

Referring to FIGS. 15 and 16, a lens 30 of the invention inscribed on the fiber 20 having an FBG 23 therein separates incoming multi-wavelength radiation λ1–λ3 27 into three, spatially separated intermediate images at a plane 52. An objective lens 53 working with a field lens 54 focus the separate images on a focal plane 33 at the entrance to corresponding fibers 55–57. The fibers may have pupil lenses 58 formed thereon of the type described in Ref. 11 and Ref. 12, hereinbefore. The apparatus of FIGS. 15 and 16 are shown operating as a demultiplexer, wherein the individual information-containing components within the input radiation 27 are separated into the corresponding fibers 55–57. Of course, the apparatus could work as a multiplexer to combine the information in fibers 55–57 into a multi-component beam of radiation within the fiber 20. As used herein, the term "multiplexer" includes the multiplex (add) function and the demultiplex (drop) function.

Figures 17, 18:
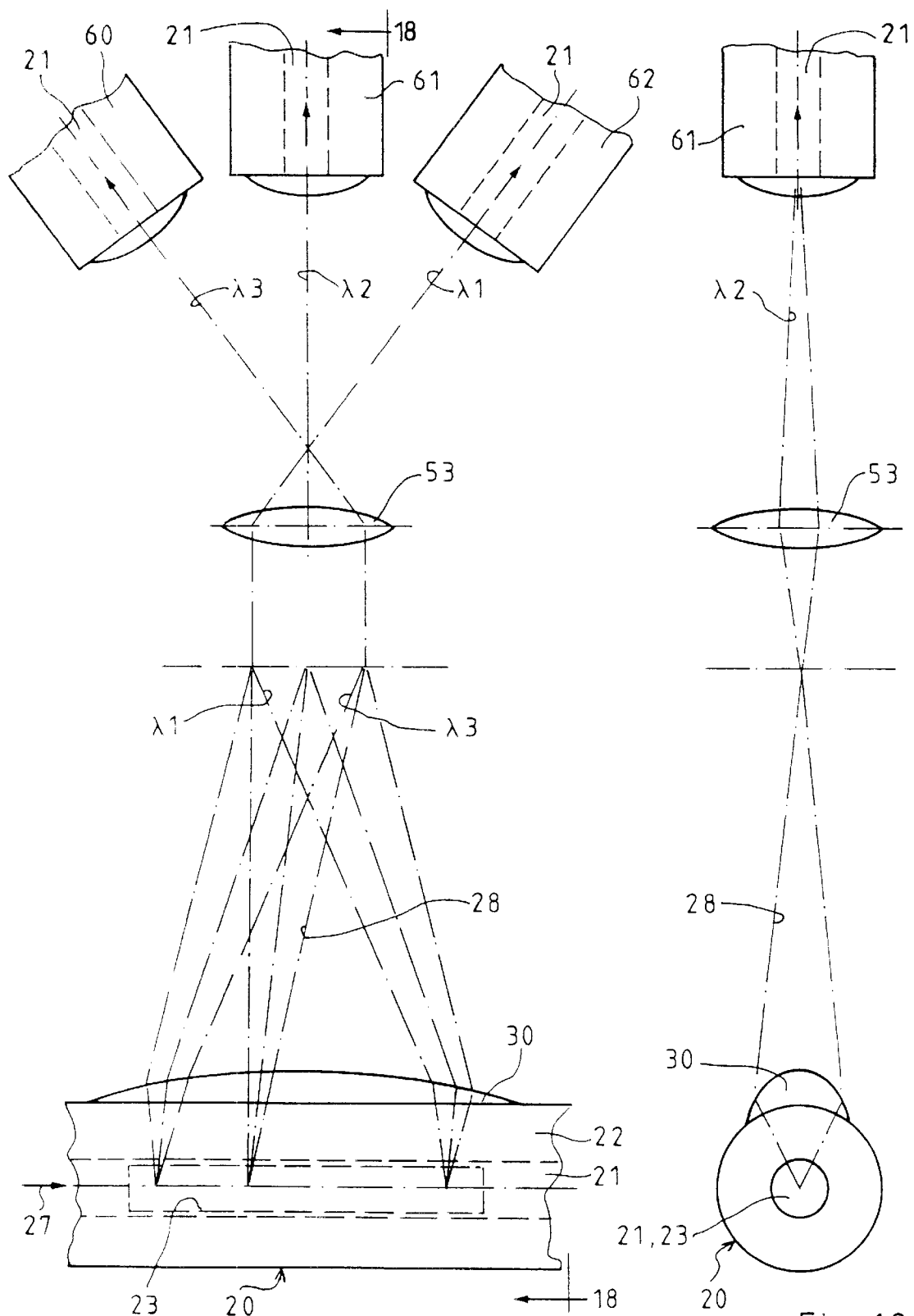
FIG. 17 is a side elevation view of a WDM apparatus employing a single magnifying lens, wherein some receiving fibers are at an angle to the image plane.
FIG. 18 is a partly sectioned side elevation view, taken on the line 18—18 of FIG. 17 (sectioning lines are omitted for clarity).
Figure 19:
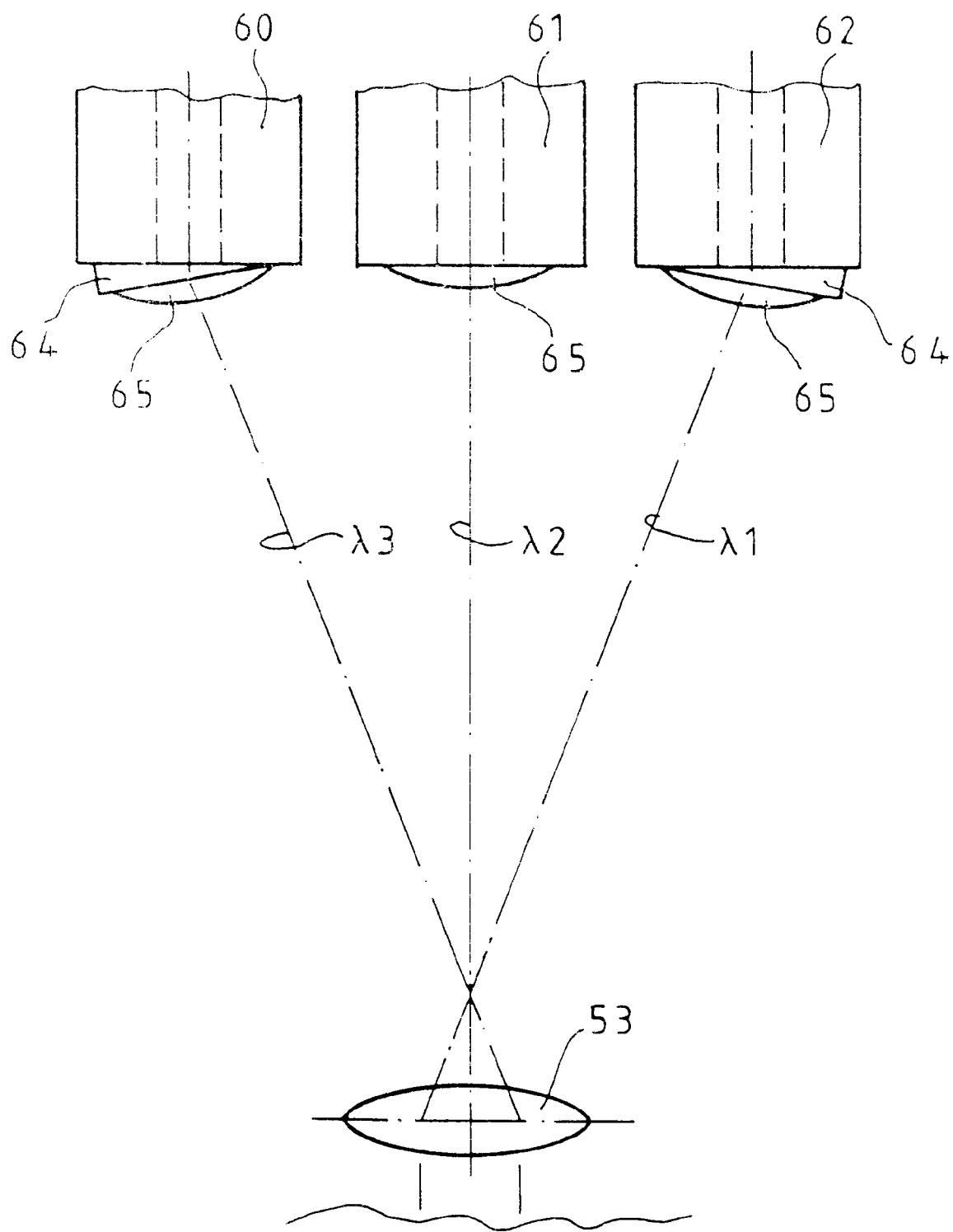
FIG. 19 is a fragmentary, side elevation view of an alternative form of single lens WDM.

FIGS. 17 and 18 illustrate apparatus similar to that of FIGS. 15 and 16, except that the field lens 54 is not utilized so that some of the light rays (λ1, λ3) leaving the focal plane are at an angle with respect to the image plane, except for light rays (λ2) at the center of the image. Although angular alignment of the fibers 60, 62 will require care, an entrance angle of radiation of up to about 10° is generally tolerable because suitable apertures (such as pupil lenses described with respect to Ref. 11 and Ref. 12 hereinbefore) may be processed to provide suitable apertures at the fiber ends. In the case where magnification is effected by a single lens 53, the light-entrance windows of the fibers 60–62 can be provided with prisms 64 and lenses 65 in the magnifying image plane, depending on the receiving-fiber arrangement in the focal plane, as shown in FIG. 19, thereby allowing direct takeup of the light to be launched into the fiber, even with the fibers 60–62 bundled up in a parallel fashion.

Referring to FIGS. 20 and 21, a WDM multiplexer employing two different types of microlenses in accordance with the invention utilizes fibers 20-3, 20-4 and 20-5 having cylindrical lenses 30 of the type described with respect to FIGS. 4 and 5 hereinbefore to carry the individual wavelength components. A fiber 20-6 having an FBG 23 of the type described hereinbefore employs a Fresnel lens 68, which provides a much longer focal length across the spectrum of wavelengths λ1–λ3 than does a spherical lens. Since the processes for producing lenses described hereinbefore can produce structures of any shape, the inscription of the Fresnel lens 68, while intricate, is readily achieved with care. Thus, the radiation starts as a complex stripe at the FBG of the fiber 20-6, and becomes stripes, perpendicular to the complex stripe, of individual wavelength components in the FBGs of the fibers 20-3, 20-4 and 20-5. The beam is shown diverging in FIG. 21 to accommodate the fact that the FBGs are generally longer than the diameter of a fiber or a microlens inscribed thereon; or, a beam expander could be used. In FIGS. 20 and 21, the input radiation 27 is separated by the FBG 23 and Fresnel lens 68 into its distinct, component wavelengths λ1–λ3 in the output radiation 28; thus, operating as a demultiplexer. Of course, radiation of separate wavelengths in the fibers 20-3, 20-4 and 20-5 could be combined in the fiber 20-6, thus operating as a multiplexer. The fibers 20-3, 20-4 and 20-5 may be loops, thus providing the capability for circulating storage devices, tapped delay lines, and timed-delay phase adjusting devices.

A variation on the operation of FIGS. 20 and 21 may employ a spherical lens on the fibers 20-3, 20-4 and 20-5 to focus to a spot in each related FBG; however, a stripe provides better coupling, as is known, and is preferred.

Any of the cylindrical or spherical lenses 30 referred to hereinbefore may be Fresnel lenses, thereby providing a much longer focal length per size of the lens, either by shaping the lens (as in FIGS. 11 and 20), or by providing the material of the lens with suitably differing indexes of refraction so as to provide the required $2\pi$ (or multiples) jumps in phase to achieve the Fresnel lens effect. Of course, the Fresnel lens in FIG. 20 could be achieved by providing differing indexes of refraction in different portions of the lens, instead of by providing different shapes in the different portions of the lens. Of course, the invention may be used in complex combinations of those functional assemblies disclosed herein, or parts thereof.

The couplers, and more particularly the multiplexers of the invention may be used with suitable, known coupling devices, such as circulators, to couple light from a sending fiber into storage fiber loops to introduce delays dependent on loop-length, and redirect the delayed light into the sending fiber.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. An optical device comprising:
    an optical fiber having an axis, a core coaxially surrounding said axis, and cladding coaxially surrounding said core and having an outer peripheral surface;
    an in-fiber Bragg grating (FBG) inscribed within a predetermined length of said core and having a principal plane of diffraction; and
    a lens inscribed in said surface of said cladding, said lens extending along approximately said predetermined length, said lens having an optical axis transverse to said fiber axis and substantially in said principal plane of diffraction, said lens oriented about said surface with respect to said principal plane of diffraction to be optically coupled with said FBG.

2. An optical device according to claim 1 wherein said optical axis is substantially perpendicular to said fiber axis.

3. An optical device according to claim 1 wherein said lens includes a prism, whereby its optical axis is at an acute angle with respect to said fiber axis.

4. An optical device according to claim 1 wherein said lens is cylindric.

5. An optical device according to claim 1 wherein said lens focuses in a first plane containing said fiber axis and in a second plane transverse to said fiber axis.

6. An optical device according to claim 5 wherein said lens is amorphic.

7. An optical device according to claim 5 wherein said lens is aspherical and has a focal length in said first plane different from its focal length in said second plane.

8. An optical device according to claim 1 wherein said lens is a Fresnel lens.

9. An optical device according to claim 8 wherein said lens consists of discrete lens portions of different focal lengths caused by different shapes.

10. An optical device according to claim 8 wherein said lens consists of discrete lens portions of different focal lengths caused by different indexes of refraction.

11. An optical coupler comprising:
    a first optical device and at least one additional optical device, each optical device including
        an optical fiber having an axis, a core coaxially surrounding said axis, and cladding coaxially surrounding said core and having an outer peripheral surface;
        an in-fiber Bragg grating (FBG) inscribed within a predetermined length of said core and having a principal plane of diffraction;
        a lens inscribed in said surface of said cladding, said lens extending along approximately said predetermined length, said lens having an optical axis transverse to said fiber axis and substantially in said principal plane of diffraction, said lens oriented about said surface with respect to said principal plane of diffraction to be optically coupled with said FBG;
    said first optical device additionally including
        at least one additional FBG inscribed within said predetermined length and having a principal plane of diffraction, there being one additional FBG for each said additional optical device, each FBG of said first optical device oriented about said core with its principal plane of diffraction at an angle with respect to the principal plane of diffraction of an adjacent FBG;
        at least one additional lens inscribed in said surface of said cladding, one for each said additional FBG, each said additional lens extending along approximately said predetermined length, each said additional lens having an optical axis transverse to said fiber axis and substantially in said principal plane of diffraction of a corresponding one of said additional FBGs, each additional lens oriented about said surface with respect to said principal plane of diffraction of said corresponding FBG to be optically coupled with said corresponding FBG;
    the lens of each said additional optical device being oriented for substantial optical coupling with a corresponding lens on said first optical device.

12. A coupler according to claim 11 wherein there are an even number of said additional devices.

13. A coupler according to claim 12 wherein there are four of said additional devices.

14. A spectrometer comprising:
    an optical fiber having an axis, a core coaxially surrounding said axis, and cladding coaxially surrounding said core and having an outer peripheral surface;
    an in-fiber Bragg grating (FBG) inscribed within a predetermined length of said core and having a principal plane of diffraction;
    a lens inscribed in said surface of said cladding, said lens extending along approximately said predetermined length, said lens having an optical axis transverse to said fiber axis and substantially in a plane including said principal plane of diffraction, said lens oriented about said surface with respect to said principal plane of diffraction to be optically coupled with said FBG; and
    an array of photodetectors disposed substantially in the focal plane of said lens.

15. A spectrometer according to claim 14 further comprising:
    means for moving said array in a direction substantially parallel with said principal plane of diffraction.

16. A spectrometer according to claim 14 further comprising:

a power-law amplifier for each of said photo detectors, each responsive to the output of the corresponding photo detector to provide an amplified signal on a corresponding signal line.

17. A spectrometer according to claim 16 further comprising:

a level detector corresponding to each of said signal lines, each for providing a signal on a related signal output line indicative of the level of signal on the corresponding one of said signal lines.

18. A spectrometer according to claim 17 further comprising:

a display device responsive to the signals on said signal output lines for indicating the levels of wavelengths sensed by said photodetectors.

19. A wavelength division multiplexer having an intermediate image plane, comprising:

an optical fiber having an axis, a core coaxially surrounding said axis, and cladding coaxially surrounding said core and having an outer peripheral surface;

an in-fiber Bragg grating inscribed within a predetermined length of said core and having a principal plane of diffraction;

a lens inscribed in said surface of said cladding, said lens extending along approximately said predetermined length, said lens having an optical axis transverse to said fiber axis and substantially in said principal plane of diffraction, said lens focusing radiation of different wavelengths to corresponding different spots separated from one another on said intermediate image plane;

a plurality of additional optical fibers, each having an optical entrance window;

an objective lens for magnifying the image on said intermediate image plane; and a field lens for collimating the image at said objective lens, said field lens displaced from said objective lens a sufficient distance to separate said collimated images by at least the diameter of said additional fibers, the optical entrance window of each of said additional fibers being optically coupled with one of said collimated images.

20. A wavelength division multiplexer having an intermediate image plane, comprising:

an optical fiber having an axis, a core coaxially surrounding said axis, and cladding coaxially surrounding said core and having an outer peripheral surface;

an in-fiber Bragg grating inscribed within a predetermined length of said core and having a principal plane of diffraction; and a lens inscribed in said cladding, said lens extending along approximately said predetermined length, said lens having an optical axis transverse to said fiber axis and substantially in said principal plane of diffraction, said lens providing optical coupling at each of a plurality of predetermined wavelengths between said FBG and corresponding spots on said intermediate image plane;

an objective lens for magnifying the image on said intermediate image plane; and a plurality of additional optical fibers, each having an optical entrance window, each displaced from said objective lens a sufficient distance to separate said spots on said intermediate image plane by at least substantially the diameter of each of said additional fibers, the optical entrance window of each of said additional fibers being optically coupled with one of said spots.

21. A multiplexer according to claim 20 wherein at least one of said additional fibers has its axis aligned at an angle to said intermediate image plane.

22. A multiplexer according to claim 20 wherein each of said additional fibers has its axis parallel to the optical axis of said objective lens, and at least one of said additional fibers has an optical entrance window with an optical axis at an angle to said intermediate image plane.

23. A wavelength division multiplexer comprising a first optical device and a plurality of additional optical devices in the vicinity of said first optical device, each of said additional optical devices corresponding to a unique one of a plurality of predetermined wavelengths, each of said optical devices including:

an optical fiber having an axis, a core coaxially surrounding said axis, and cladding coaxially surrounding said core, and having an outer peripheral surface;

an in-fiber Bragg grating (FBG) inscribed within a predetermined length of said core and having a principal plane of diffraction; and a lens inscribed in said surface of said cladding, said lens extending along approximately said predetermined length, said lens having an optical axis transverse to said fiber axis and substantially in said principal plane of diffraction, said lens oriented about said surface with respect to said principal plane of diffraction to be optically coupled with said FBG, the lens of each of said additional devices being optically coupled to the lens of said first device at said corresponding wavelength.

24. A multiplexer according to claim 23 wherein said lens of said first device is a Fresnel lens.

25. A multiplexer according to claim 24 wherein said Fresnel lens consists of discrete lens portions of different focal lengths caused by different shapes.

26. A multiplexer according to claim 24 wherein said Fresnel lens comprises discrete lens portions of different focal lengths caused by different indexes of refraction.

27. A multiplexer according to claim 23 wherein the FBG of said first device substantially encompasses the focal plane of each said lens of said additional devices and the FBG of each of said additional devices substantially encompasses the focal plane of said lens of said first device.

28. A multiplexer according to claim 23 wherein said lens of said first device focuses to a spot in each said lens of said additional devices.

29. A multiplexer according to claim 23 wherein the portion of the fiber axis of each of said additional devices which is in the vicinity of said first optical device is perpendicular to the portion of the fiber axis of said first optical device which is in the vicinity of said additional optical devices.

* * * * *